United States Patent [19]

Stewart

[11] 3,838,460

[45] Sept. 24, 1974

[54] VIDEO DISK LATCHING HUB ASSEMBLY

[75] Inventor: David S. Stewart, Palatine, Ill.

[73] Assignee: Zenith Radio Corporation, Chicago, Ill.

[22] Filed: July 2, 1973

[21] Appl. No.: 375,586

[52] U.S. Cl. .................... 360/99, 51/358, 51/376, 274/39 A, 346/137, 360/86, 360/97

[51] Int. Cl.... G11b 5/82, G11b 17/00, G11b 25/04

[58] Field of Search .............. 346/137; 51/358, 376; 274/4 H, 39 A; 352/102; 178/6.6 DD; 360/86, 97, 98, 99

[56] References Cited

UNITED STATES PATENTS

| | | | |
|---|---|---|---|
| 1,206,809 | 12/1916 | Bruckner | 346/137 |
| 1,458,531 | 6/1923 | Hodgkinson | 346/137 |

FOREIGN PATENTS OR APPLICATIONS

| | | | |
|---|---|---|---|
| 631,264 | 10/1949 | Great Britain | 346/137 |

*Primary Examiner*—Bernard Konick
*Assistant Examiner*—Robert S. Tupper
*Attorney, Agent, or Firm*—Cornelius J. O'Connor; John J. Pederson

[57] ABSTRACT

Apparatus for releasably securing a video disc for playback includes a hub having an axial bore and means for supporting and indexing the disc. A post is journalled within the hub bore for axial displacement between an elevated quiescent position and a depressed actuated position. The post includes a detent which is engageable by a latch to releasably captivate the post when it is displaced to its actuated position. A biasing arrangement, in the form of multiple spring fingers, is coupled to the post and engageable with an indexed disc when the post is displaced to its actuated position to secure the disc upon the hub. The spring fingers also serve to return the post to its quiescent position when the latch and detent are disengaged.

10 Claims, 12 Drawing Figures

VIDEO DISK LATCHING HUB ASSEMBLY

BACKGROUND OF THE INVENTION

This invention relates in general to video disc players and in particular to apparatus for releasably securing a video disc for high speed rotation in such a player.

The record disc familiar to most is the conventional audio record, generally a 0.050 inch thick vinyl disc which is indexed by a spindle and supported by a rotatably driven turntable for presentation to a pick-up stylus. For all practical purposes there are but two types of audio discs on the market today, the 33 ⅓ RPM long-play record and the 45 RPM short-play.

By way of contrast a video disc of the type herein considered is formed from 0.006 inch vinyl sheet, a construction which renders it extremely flexible and, to some extent, dictates the manner in which the disc is driven, or "flown," since it is partially supported for rotation upon a cushion of air. A video disc is further distinguished from an audio record by virtue of the fact that the former must store an enormous quantity of information in comparison to that impressed upon the audio record. To accommodate such information the center-to-center spacing between adjacent tracks on a video disc is in the order of 7 microns. By way of comparison, the center-to-center spacing between the tracks in an audio record is approximately 100 microns. For reasons pertinent to the signal processing techniques employed in retrieving the information stored on a video disc, the disc is driven at a speed substantially in excess of that at which audio discs are rotated, for example, a video disc of the type herein described is driven or flown at 1,800 RPM. However, it is recognized that it is also possible to fly video discs at 900 or even 450 RPM, speeds that still point up a significant difference between video and audio record play. It is therefore obvious that the apparatus and techniques employed in playing audio records are not readily adaptable to play-back of video discs.

A playback deck specifically designed for video discs is described in copending application Ser. No. 277,029, now U.S. Pat. No. 3,803,351, which was filed Aug. 1, 1972 in the names of Charles R. Pedersen and David S. Stewart, which application is assigned to the same assignee as the present invention. As shown in that application, the video disc is indexed upon a hub and secured thereon by a removable magnetic type keeper, a component prone to misplacement. It is extremely important that the disc be firmly and releasably anchored to the hub since any variation in disc speed due to slippage between the disc and the hub will be manifested as incorrect information as the record track is monitored by the pick-up transducer. Accordingly, it is not only important that the disc be firmly secured to the hub but that provision be made for readily mounting and removing the disc. It is also important that the disc securing apparatus be arranged or so constructed as to preclude its loss or misplacement.

It is therefore a principal object of the invention to provide an improved hub assembly for releasably securing a video record disc for high speed rotation in a disc player.

It is also an object of the invention to provide a video disc indexing and supporting hub which automatically releases a disc upon completion of a play cycle.

SUMMARY OF THE INVENTION

Apparatus for releasably securing a centrally apertured record disc for high speed rotation in a video disc player comprises a hub having an axial bore and means cooperating with the disc aperture for indexing and supporting the record disc. A post, comprising detent means is journalled within the hub bore for axial displacement between a quiescent position for admitting a record disc to the disc indexing and supporting means and an actuated position. Latch means, engageable with the post detent means, are provided for releasably captivating the post upon displacement of the post to its actuated position. Finally, resilient biasing means coupled to the post is engageable with an indexed record when the post is displaced to its actuating position to secure the indexed disc upon the disc supporting means and for returning the post to its quiescent position upon disengagement of the latch means and the detent means.

DESCRIPTION OF THE PREFERRED EMBODIMENT

Figures 1, 2, 7A, 7B, 7C:
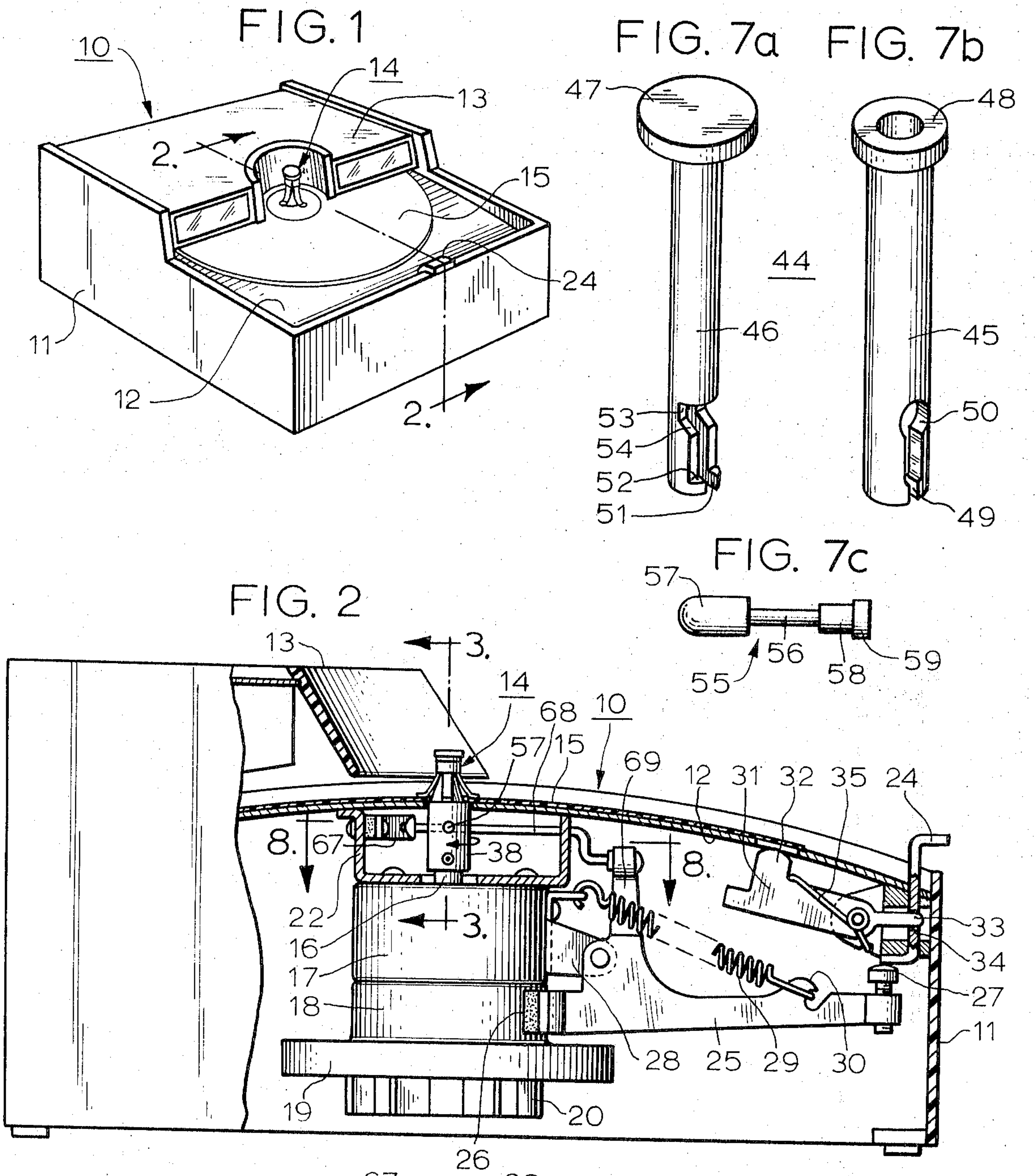
FIG. 1 is a perspective view of a video disc playback machine employing a hub assembly constructed in accordance with the invention.
FIG. 2 is a sectional view taken along lines 2—2 in FIG. 1 showing the underside of the machine deck.
FIGS. 7*a*, 7*b* and 7*c* collectively illustrate the several components of the bipartite post and latch portion of the hub assembly.

The apparatus herein described finds particular application in a disc playback machine of the type shown and described in the aforementioned copending Pedersen et al application. Accordingly, and with reference to FIGS. 1 and 2, such a playback machine 10 comprises a housing 11 having a curved centrally apertured deck 12 which is supported by ledges secured to the inside walls of the housing. A cover 13, which overlies a portion of the deck, serves to protect a carriage assembly employed for supporting and tracking a transducer pick-up device across the vinyl disc. A carriage suitable for this function is described and claimed in copending application Ser. No. 277,074 which was filed on Aug. 1, 1972 for David S. Stewart, which application is also assigned to the same assignee as the subject invention. Since the type of transducer carriage employed is not germane to the present invention it is not shown nor described.

In place of a turntable, apparatus in the form of a hub assembly 14 is utilized for releasably securing a centrally apertured vinyl disc 15 for rotation above deck 12. The hub assembly is secured atop the rotatable shaft 16 of a constant speed motor 17, preferably a hysteresis synchronous type unit, having an external armature 18 that supports a fly wheel 19 and a cooling fan 20, see FIG. 2. The motor is suspended from a bracket 22, which is affixed to the underside of deck 12. Mounted in this fashion hub assembly 14 extends through the central opening in the deck to receive vinyl disc 15.

In accordance with the invention disclosed and claimed in the aforementioned Pedersen, et al, application, machine 10 is provided with a combination brake and disc ejector control rod 24 which facilitates removal of a disc by bringing the spinning hub assembly to a stop and then lifting the peripheral edge of the disc away from deck surface 12. If desired, control 24 may also be coupled to an on-off switch so that one control can be employed to deenergize the drive motor as well as to brake it. As seen in FIG. 2, control 24, which has both ends bent at right angles to form appropriate actuating surfaces, is slidably supported on a wall of housing 11 for vertical displacement. The assembly associated with this control rod is seen to comprise a spring loaded bell crank 25 which has a brake shoe 26 affixed to one end and an adjustable stop 27 located at the other end for presentation to the lower end of control rod 24. Crank 25 is pivotally mounted on a bracket 28 which, in turn, is secured to the housing of motor 17. As shown, brake shoe 26 is arranged so that it can be brought to bear against the external surface of motor armature 18 to obtain the desired braking action. A return spring 29 extending between bracket 28 and a hook 30 on crank 25 baises the crank so that the brake shoe is normally withdrawn from armature 18.

The brake and disc ejector assembly also includes a lifter arm 31 which is pivotally supported on a side wall of deck housing 11. A lobe 32, formed near one end of arm 31, is positioned beneath an aperture in deck 12. The other end of arm 31 comprises a tongue 33 which is received in a slot 34 formed in the shank of control rod 24 so that depressing rod 24, in addition to braking the motor armature, pivots arm 31 causing lobe 32 to engage the underside disc 15 and lift it clear of deck 12. Although the spring 29 is provided to bias crank 25 into engagement with control rod 24 and, in so doing, to bias arm 31 into its retracted position, an additional wire spring 35 is provided about the pivotal axis of lifter arm 31 to insure that this arm will always be returned to its retracted position when rod 24 is released.

Figure 3:
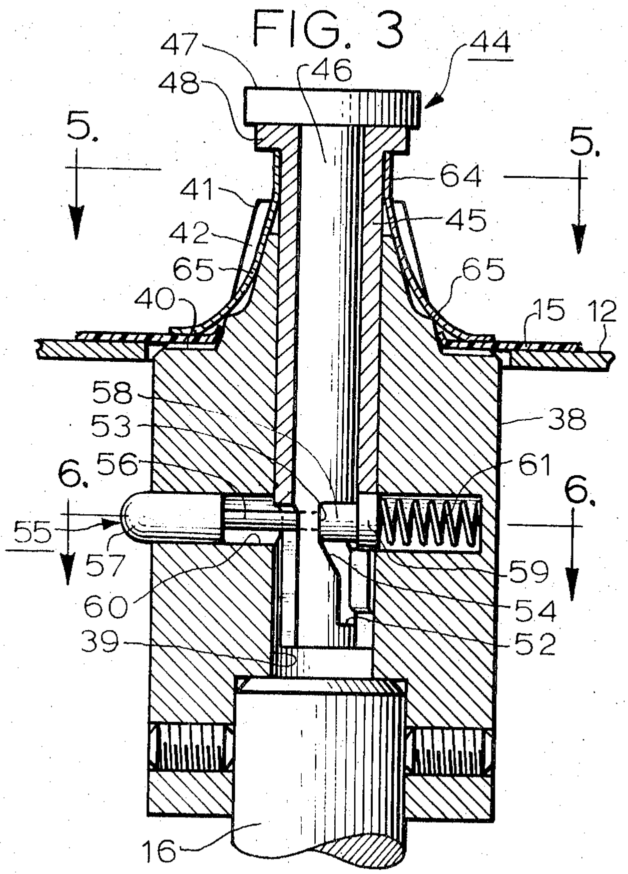
FIG. 3 is a fragmentary sectional view of the hub assembly taken along lines 3—3 in FIG. 2.

In accordance with the subject invention, and as best seen in FIGS. 3–6, a hub assembly for releasably securing a centrally apertured disc 15 for high speed rotation in a disc player comprises a hub 38 having an axial bore 39 and means cooperable with the disc aperture for indexing and supporting the disc. More particularly, hub 38 comprises a shelf 40 having a serrated surface for supporting the disc and, projecting upward from the surface of the shoulder and preferably formed integral therewith, an indexing arrangement in the form of a truncated cone 41. The sloping outer wall of the cone serves to direct the disc toward shelf 40. As best seen in FIG. 3, the diameter of the base of the cone is slightly larger than the diameter of the disc's aperture to assure an accurate centering of the disc relative to the center of rotation of motor shaft 16. Preferably, the wall of the cone is provided with a plurality of recesses 42, the purpose of which is explained below.

Figure 4:
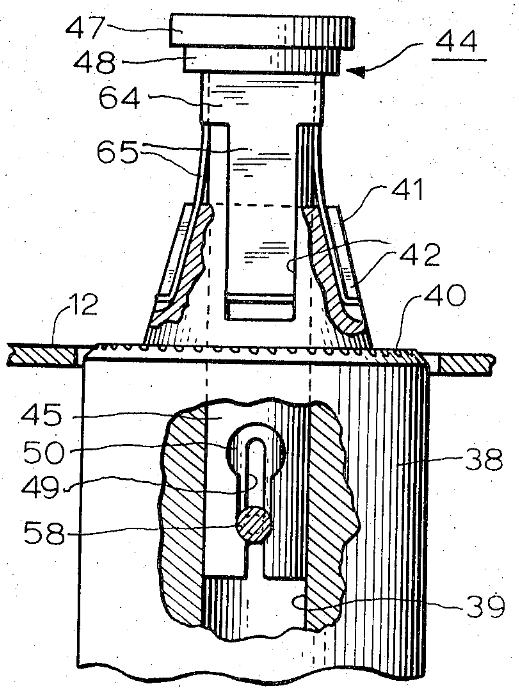
FIG. 4 is also a fragmentary view, again partly in section, of the hub assembly shown in FIG. 3 but rotated 90°.
Figure 6:
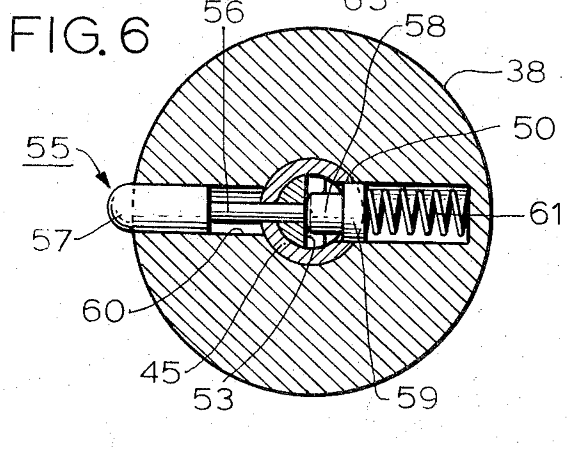
FIG. 6 is a sectional view taken along lines 6—6 in FIG. 3.

The hub assembly further includes a post 44, comprising detent means, which is journalled within bore 39 for axial displacement between an elevated quiescent position for admitting a record disc to shelf 40 and a depressed actuated position in which the disc is releasably secured for rotation. As will be shown the detent means comprises a pair of stops which are axially spaced along the post for sequential engagement with latch means that releasably captivate the post, alternately, in the aforesaid quiescent and actuated positions. In the principal embodiment post 44 is of a bipartite construction, see FIGS. **7*a*, 7*b* and 7*c*, in that it comprises a hollow sleeve 45 coaxially enclosing a rod 46 which is surmounted by a cap 47. An overhanging rim 48 is disposed atop sleeve 45 while a portion of the lower extremity of the sleeve is provided with a cross-slot 49 that forms a substantially rectangular window in one wall and a keyhole shaped opening 50 in the wall diametrically opposite thereto. Keyhole 50 constitutes one of the detent stops, specifically, the one that captivates the post in its actuated position. Rod 46 also has a cross-slot 51 through a portion of its lower end which is similar in width to the slot 49 through sleeve 45. The slotted portion of rod 46 is further mutilated to provide a detent stop 52 adjacent its lower end and a well 53 adjacent the upper terminus of slot 51. An inclined track 54 extends between stop 52 and well 53. As best seen in FIGS. 3, 4 and 6, slots 49, 51 in the sleeve and rod, respectively, and detents 50, 52 terminating rod 46 cooperate with a latch means engageable therewith to releasably captivate post 44 when it is displaced to its actuated position, as well as to retain post 44 in bore 39** of the hub.

Turning now to the details of the latch, this device can take the form of a rounded pin 55 provided with a reduced central neck section 56 having a length approximating the diameter of hub bore 39 and a diameter slightly smaller than that of post slots 49 and 51 so as to be receivable in those slots when they are aligned. As best seen in FIG. **7*c*, that portion 57 of the latch pin adjacent the left end of neck 56 retains a constant diameter while the part at the other end of the neck is stepped to form a collar 58 which is followed by a crown 59. As depicted in FIGS. 3 and 6, latch pin 55 is slidably received in a hole 60 extending through hub 38 and disposed perpendicular to the axis of the hub. It is particularly apparent in FIGS. 3 and 4 that neck section 56 of the pin extends through and is seated in slots 49 and 51, respectively, of the sleeve and rod. A coil spring 61, inserted between crown 59 of the pin and the end wall of hole 60, serves to maintain a constant bias on the latch pin in a direction normal to the axes of sleeve 45 and rod 46. Notwithstanding this spring bias, the pin is captivated within the hub since neither collar 58 nor crown 59 of the pin can pass through slots 49, 51 in post 44. As a result, in the depressed or actuated position of the post, which is illustrated by FIG. 3, the post is releasably captivated by virtue of an arrest occasioned by the seating of the crown 59 of the latch pin in the keyhole portion 50 of sleeve slot 49. Then, when the post is restored to its quiescent position, compare FIG. 4 to FIG. 3, as by lifting rod cap 47, the inclined track 54 of the rod is driven against the side of pin collar 58 camming the pin inwardly against spring 61 to move crown 59 out of keyhole 50 thereby permitting rod 46 to rise until its detent stop 52 engages collar 58 of the latch pin. The sleeve 45 is simultaneously displaced to the quiescent position by a biasing means described below. Actually, the sleeve's upward displacement is arrested when the lower contour of key way 50 encounters pin collar 58, see FIG. 4. The rod and sleeve are then maintained in the elevated position by the aforesaid biasing means and retained in the hub by virtue of the engagement between pin collar 58 and rod abutment 52 which prevents the rod and sleeve 45 from being withdrawn from bore 39. In this fashion, through the cooperation of the spring biased latch pin and the slotted rod and sleeve arrangement, post 44** is releasably captivated in the actuated position as well as retained in the hub.

Figure 5:
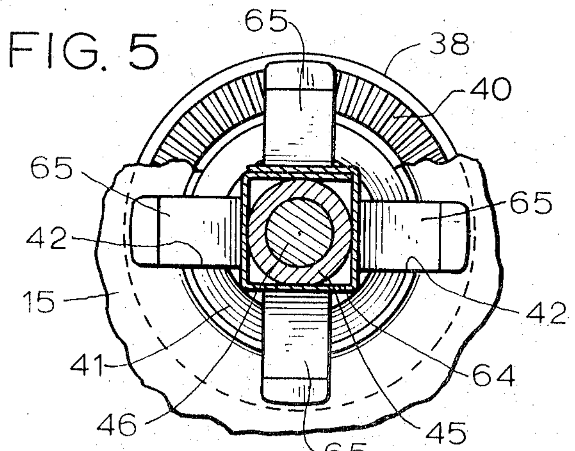
FIG. 5 is a fragmentary sectional view taken along lines 5—5 in FIG. 3.

Post 44 is displaced to its quiescent position by a resilient biasing means which is coupled to the post and engageable with the surface of an indexed disc when post 44 is displaced to its actuated position. More particularly, and as best seen in FIGS. 3–5, this biasing means comprises a ring 64, formed preferably from a strip of phosphor bronze, from which a plurality of fingers 65 depend therefrom. This biasing arrangement is mounted upon sleeve 45 with ring 64 bearing against sleeve rim 48 and with the spring fingers slideably disposed in the recesses 42 formed in the wall of cone 41. The sloping wall of cone 41, in particular that portion immediately below recesses 42, see FIG. 3, spreads fingers 65 outwardly from their normal positions thus setting up restoring forces in the fingers which forces are effectively exerted against the underside of sleeve rim 48 thus maintaining a constant upwardly directed bias against the sleeve which, in turn, applies this force to the cap 47 of rod 46. The length of the spring fingers is selected so that when post 44 is in its elevated position, FIG. 4, the lower extremities of the fingers are retracted into recesses 42 as they are raised clear of hub shelf 40 and, of course, the surface of an indexed video disc. This retraction of the fingers permits removal of the disc. On the other hand, when post 44 is depressed to its actuated position the extremities of spring fingers 65 descend within recesses 42 to engage the surface of the index disc and effect a non-slip frictional engagement between the underside of the disc and the serrated surface of hub shelf 40. In this manner the disc is secured for high speed rotation upon the hub.

The manner in which post 44 is releasably captivated in its actuated position will now be described. After a video disc has been dropped upon the conical portion of the hub it descends until its outer portion engages deck surface 12. As shown in FIG. 3, the diameter of the base of cone 41 is slightly larger than the diameter of the indexing aperture of the disc, a construction intentionally employed in order to assure centering of the video disc relative to the center of rotation of the drive unit, namely, motor shaft 16. Rod 46 of the post is then depressed until its slot 51 bottoms against neck section 56 of the latch pin. Simultaneously, sleeve 45 is driven down by rod 46. At this juncture the biasing force exerted by spring 61 drives the latch pin 55 to the left, as viewed in FIG. 3, to seat its collar 58 in well 53 and insert crown 59 in keyhole slot 50. With the post now latched in its actuated position and with spring fingers 65 firmly engaging the upper surface of the video disc, the disc player is ready for operation.

After the disc has been played it is removed by physically elevating the post to unlatch pin 55 in the manner previously described. With the crown of the latch pin clear of keyhole 50 only the neck section 56 of the pin remains within slot 49. The biasing force exerted by spring fingers 65 then drives the sleeve and the rod upwardly until the travel of rod is arrested by rod abutment 52 encountering collar 58 of the pin. Again, as mentioned above, further upward displacement of the sleeve is prevented by virtue of the engagement of collar 58 with the bottom of keyhole 50.

Figure 8:
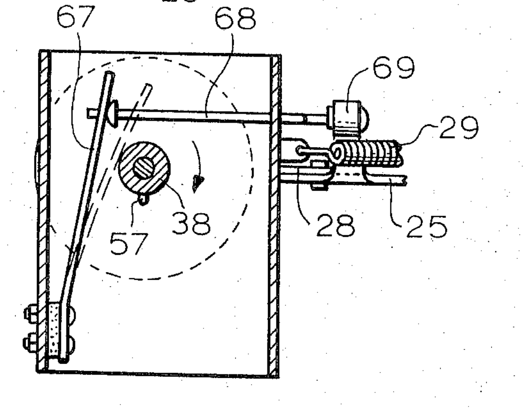
FIG. 8 is a fragmentary sectional view taken along lines 8—8 in FIG. 2.

It will be recognized that the post can also be released from its actuated position by depressing end 57 of the latch pin to displace the crown of the pin from keyhole 50. However, as is apparent in FIG. 2 latch pin 55 is not accessible when a video disc is indexed upon the deck. Accordingly, and for the purpose of effecting release of the post without manually raising it, means responsive to actuation of control rod 24 are provided for effecting such a release. More particularly, and as best seen in FIGS. 2 and 8, such means comprises a latch trip in the form of a leaf spring 67 which has one end anchored to motor support bracket 22. The free end of the spring is coupled via a pull rod 68 to a rocker arm 69 which is formed as an extension of bell crank 25 so as to be pivotally displaceable therewith.

In operation, then, after a video disc is positioned upon the hub and locked for rotation by displacing post 44 to its actuated position, motor 17 is energized to bring the disc to playing speed. At such time as playback of the disc is completed control rod 24 is depressed which, as previously noted, can also effect deenergization of the motor. Further, depression of the control rod pivots bell crank 25 clockwise to drive brake shoe 26 against armature 18 of the motor to arrest rotation of the disc. At the same time this pivoting of the bell crank also rotates arm 69 to insert the trip spring 67 into the path of the protruding portion 57 of latch pin 55. Upon engaging the trip spring the latch pin is driven inwardly to displace pin crown 59 from keyhole 50 in the sleeve to release it and thus permit the sleeve, under the biasing force of the spring fingers 65, to elevate rod 46 to the quiescent position.

The above-described hub assembly, by virtue of its bipartite sleeve-and-rod construction finds particular utility in those applications where it is desired or required that the hub assembly be manually operable from above the deck in order to release an indexed video disc. As noted above, a disc can be released from the deck by an operator raising the post or, alternatively, by actuating a latch trip spring situated beneath the deck. An alternative embodiment of the invention characterized by a simple post, as contrasted to a bipartite post, will now be described. While the post to be described has the advantage of a simpler and less expensive construction it can not be released manually from above the deck but requires a latch tripping arrangement of the type above described and shown in FIG. 2.

DESCRIPTION OF THE ALTERNATE EMBODIMENT

Figure 9:
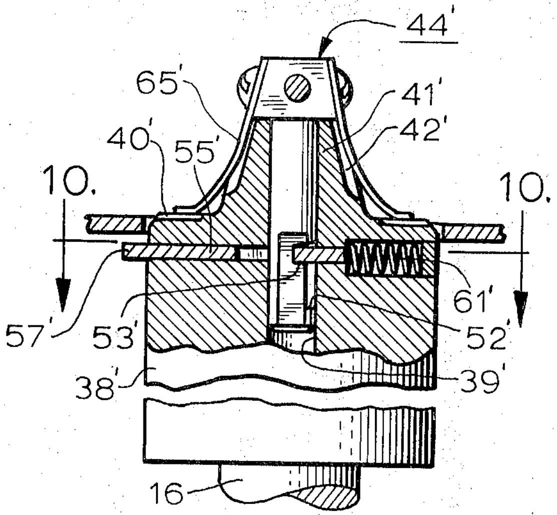
FIG. 9 is a fragmentary view, partly in section of an alternate construction for the hub assembly in FIG. 3.
Figure 10:
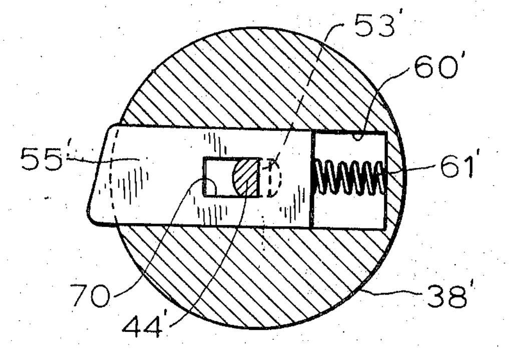
FIG. 10 is a sectional view taken along lines 10—10 in FIG. 9.

An alternate embodiment of apparatus for releasably securing a video disc, as shown in FIGS. 9 and 10, also comprises a hub 38′ having an axial bore 39′ and a shelf 40′ with a serrated surface for supporting the disc. An indexing arrangement in the form of a cone 41′ extends upwardly from shelf 40'. As in the principal embodiment the base of cone 41' is slightly larger than the diameter of a disc indexing aperture to assure centering of the disc relative to the axis of rotation shaft 16. In this embodiment the wall of the cone may also be provided with recesses 42'. The hub assembly in this alternate embodiment includes a single element post 44' which is journalled in bore 39' for axial displacement between an elevated quiescent position and a depressed actuated position. The lower extremity of the post is provided with a first detent or abutment 52' adjacent the lower end of the post and a second abutment 53' displaced a distance above abutment 52' equivalent to the axial displacement desired for the post. In other words, the axial spacing of these abutments determines the travel of the post from its quiescent to its actuated positions. As shown in the drawing that portion of post 44' extending between the abutments is provided with opposed flattened surfaces to constitute that portion of the post a key that cooperates with the latch means.

The latch arrangement takes the form of a flat plate 55' having a rectangular aperture 70 formed therein. The width of this aperture is dimensioned to snugly receive the flattened sides of post 44' so that the post is effectively keyed for nonrotational vertical displacement only. As shown in the drawing the length of aperture 70 is selected to provide that displacement of the latch plate necessary to permit it to captivate the post in either its elevated position or actuated positions. In order to accommodate latch plate 55' hub 38' is provided with a rectangular slot 60' and, as in the principal embodiment, the latch is seated against a biasing arrangement in the form of a spring 61' which maintains a constant bias on the latch plate in a direction normal to the axis of post 44'. Also, in a manner similar to that employed in the principal embodiment, the cooperation between the latch plate and the post is such that both elements are mutually captivated within the hub.

Post 44' is normally maintained in its quiescent position by resilient biasing means in the form of a plurality of spring fingers 65' which are affixed to the upper extremity of the post. Again, the length of the spring fingers is selected so that when post 44' is in its elevated quiescent position the lower extremities of the fingers are clear of hub shelf 40' and therefore, spaced from the surface of an indexed disc.

Insofar as operation is concerned, the alternate embodiment functions in substantially the same fashion as the initially described arrangement in that axial depression of the post drives the spring fingers 65' into engagement with the surface of an indexed disc to effect a non-slip engagement between the disc and the serrated surface of the hub shelf 40'. In this position, as shown in FIG. 9, latch plate 55' is driven to the left by spring 61' so as to seat against abutment 53' and thus prevent fingers 65' from returning the post to the elevated position. However, in order to restore the post to its elevated position, resort must be had to an underdeck latch release mechanism of the type already shown and described in the discussion of FIG. 8. This type of release is required since the single post construction does not embody a release like the camming arrangement found in a bipartite construction of the principal embodiment. Accordingly, to return the post from its actuated position to the quiescent position to permit removal of an indexed disc, the rocker arm 69 shown in FIG. 2 is pivoted to draw the latch tripping spring 67 into the path of that portion 57' of the latch plate protruding from the hub. In a manner similar to that described for the principal embodiment the spring 67 depresses the latch plate to release post 44' which permits resilient spring fingers 65' to drive post 44' upwardly until it is arrested by the seating of latch plate 57' against lower post abutment 52' so that the indexed disc may be removed.

While particular embodiments of the invention have been shown and described, it will be obvious to those skilled in the art that changes and modifications may be made thereto without departing from the invention in its broader aspects and, therefore, the aim in the appended claims is to cover all such changes and modifications as fall within the true spirit and scope of the invention.

I claim:

1. Apparatus for releasably securing a centrally apertured record disc for high speed rotation in a video disc player, said apparatus comprising:

- a hub having an axial bore, a relieved portion disposed effectively normal thereto, and means cooperable with the disc aperture for supporting and indexing a record disc;
- a post, comprising detent means, journalled within said hub bore for axial displacement between a quiescent position for admitting a record disc to said disc indexing and supporting means and an actuated position;
- latch means slidably disposed within said relieved portion of said hub and engageable with said post detent means for releasably captivating said post upon displacement of said post to its actuated position; and
- resilient biasing means coupled to said post and engageable with an indexed record when said post is displaced to its actuated position for securing said indexed disc upon said disc supporting means and for returning said post to its quiescent position upon disengagement of said latch means and said detent means.

2. Apparatus as set forth in claim 1 which further includes means external to said hub and engageable with said latch means for releasing said post from its actuated position.

3. Apparatus as set forth in claim 1 in which said disc supporting and indexing means comprises a shelf formed on said hub and a conical pedestal extending from said shelf for cooperating with the disc aperture.

4. Apparatus as set forth in claim 3 in which said resilient biasing means comprises a plurality of spring fingers and said pedestal includes a like plurality of relieved portions for receiving and guiding said spring fingers into engagement with an indexed disc.

5. Apparatus as set forth in claim 1 in which said detent means comprises at least two stops axially spaced along said post and sequentially engageable with said latch means for releasably captivating said post, alternately, in said quiescent and said actuated positions.

6. Apparatus as set forth in claim 5 in which said latch means comprises a pin having a reduced central section, a crown portion at one extremity of said pin and a collar portion intermediate said reduced section and said crown portion, and further comprises means for urging one of said crown and collar portions in engagement with that one of said detent stops presented thereto.

7. Apparatus as set forth in claim 6 in which said post comprises a bipartite assembly comprising a sleeve and a rod coaxially mounted therein, said sleeve and said rod each having an axially disposed slot for receiving said reduced section of said pin, said sleeve slot including one of said detent stops for engaging said latch pin crown to retain said post in said actuated position, and said rod including, another of said detent stops for engaging said latch pin collar to retain said rod and said sleeve within said hub axial bore.

8. Apparatus as set forth in claim 7 in which said rod includes cam means for displacing said latch pin crown from said sleeve detent when said rod is elevated toward said quiescent position.

9. Apparatus as set forth in claim 1 in which said detent means comprises a pair of abutments integrally formed of said post.

10. Apparatus as set forth in claim 9 in which said latch means comprises a plate having a cut out for receiving and engaging said post detent means, and means for urging said plate into engagement with said detent means.

* * * * *